United States Patent [19]

West et al.

[11] Patent Number: 4,862,453
[45] Date of Patent: Aug. 29, 1989

[54] COMMUNICATION SYSTEM

[75] Inventors: Barry G. West; Boleslaw M. Sosin, both of Chelmsford; Roger K. Tolfree, Witham, all of United Kingdom

[73] Assignee: The Marconi Company Limited, Stanmore, United Kingdom

[21] Appl. No.: 103,744

[22] Filed: Oct. 2, 1987

[30] Foreign Application Priority Data

Oct. 3, 1986 [GB] United Kingdom ............... 8623763

[51] Int. Cl.$^4$ ............................................. H04J 3/16
[52] U.S. Cl. ..................................... 370/82; 370/100; 375/111
[58] Field of Search ............... 370/100, 110.1, 111, 370/95, 93, 79, 82, 83; 455/33, 56; 375/111, 121

[56] References Cited

U.S. PATENT DOCUMENTS

| | | | |
|---|---|---|---|
| 3,602,647 | 3/1971 | Kawashima | 370/110.1 |
| 4,160,877 | 7/1979 | Vandermey | 370/83 |
| 4,398,289 | 8/1983 | Schoute | 370/93 |
| 4,583,221 | 4/1986 | Uchida etal. | 370/100 |
| 4,612,637 | 9/1986 | Davis et al. | 370/95 |
| 4,648,090 | 3/1987 | Maddern et al. | 370/100 |
| 4,653,049 | 3/1987 | Shinayo | 370/95 |
| 4,686,673 | 8/1987 | Hoffa | 370/100 |
| 4,782,484 | 11/1988 | Limb | 370/100 |

FOREIGN PATENT DOCUMENTS 2166929 5/1986 United Kingdom .

Primary Examiner—Douglas W. Olms
Assistant Examiner—Frank M. Scutch, III
Attorney, Agent, or Firm—Lowe, Price, LeBlanc, Becker & Shur

[57] ABSTRACT

In a dynamic frame length slotted ALOHA system the synchronizing signals are transmitted by a base station at different frequencies (each having a period equivalent to a multiple of the time slot period). The different frequencies denote different frame lengths and the central stations detect these frequencies and select a frame length accordingly.

7 Claims, 3 Drawing Sheets

COMMUNICATION SYSTEM

BACKGROUND OF THE INVENTION

This invention relates to a communication system and to a central station and to a sub-station in such a system. It arose in the design of a trunked mobile telephone system but would also be applicable to other situations such as multi-user computer systems, and satellite communication systems.

In such a communication system some facility needs to be provided to prevent sub-stations currently having messages to transmit from all doing so simultaneously.

An established technique for doing this (known as dynamic framelength slotted ALOHA) uses a base station which transmits synchronising signals defining the beginnings of "Frames" each containing a specified number of time slots, this number being given in a code which forms part of the synchronising signal. A sub-station having a message to transmit notes the number of time slots in a frame (as given by the code) and transmits its message in one of those time slots which it selects according to some predetermined rule, as described in U.S. Pat. No. 4,398,289, the contents of which are incorporated herein by reference. This system has the advantage that the changes of any two sub-stations transmitting simltaneously are reduced by an amount which depends on the frame length. This frame length can be varied by the main station according to prevailing conditions: a short frame length being preferred in conditions of light traffic to reduce the time that a sub-station needs to wait before transmitting its message; and a long frame length being preferred in conditions of heavy traffic to reduce the chances of two or more sub-stations transmitting in the same time slot.

This invention arose from the realisation that the frequency of the synchronising signals can be used by the sub-station to define the number of slots in a frame and that it is therefore unnecessary for the main station to transmit or for the sub-stations to receive the aforementioned code.

SUMMARY OF THE INVENTION

This invention provides a communication system comprising: a central station having means for transmitting synchronising signals each defining the beginning of a time slot and means for selecting the interval between synchronising signals from different integral multiples of a time slot; and a number of sub-stations each having means which is responsive to the timing of the synchronising signals and which is operative to transmit a message in a time slot selected from a number of time slots together forming a frame, depending on the said timing.

Thus by employing the invention the need for the aforementioned code is removed, resulting in greater overall simplicity.

Without this code the significance of the synchronising signal in marking the beginning of each frame disappears: its remaining purpose being only to synchronise the time slots. It thus becomes possible to have a frame length (i.e. the combined duration of the group of time slots from which a sub-station selects a particular slot for transmission of its message) greater or smaller than the time between synchronising signals. The means responsive to the timing between synchronising signals preferably measures a time interval between two adjacent synchronising signals. There are however other possibilities. It may for example measure a time interval between the beginnings of time slots which are not introduced by a synchronising signal; or it may measure the time interval between alternate synchronising signals; or it may measure the frequency of a succession of synchronising signals; or it may detect a code whose digits are defined by the presence or absence of a synchronising signal at the beginning of each of a succession of time slots.

BRIEF DESCRIPTION OF THE DRAWINGS

Two ways in which the invention may be performed will now be described by way of example with reference to the accompanying drawings in which.

DESCRIPTION OF THE PREFERRED EMBODIMENT

Figure 1:
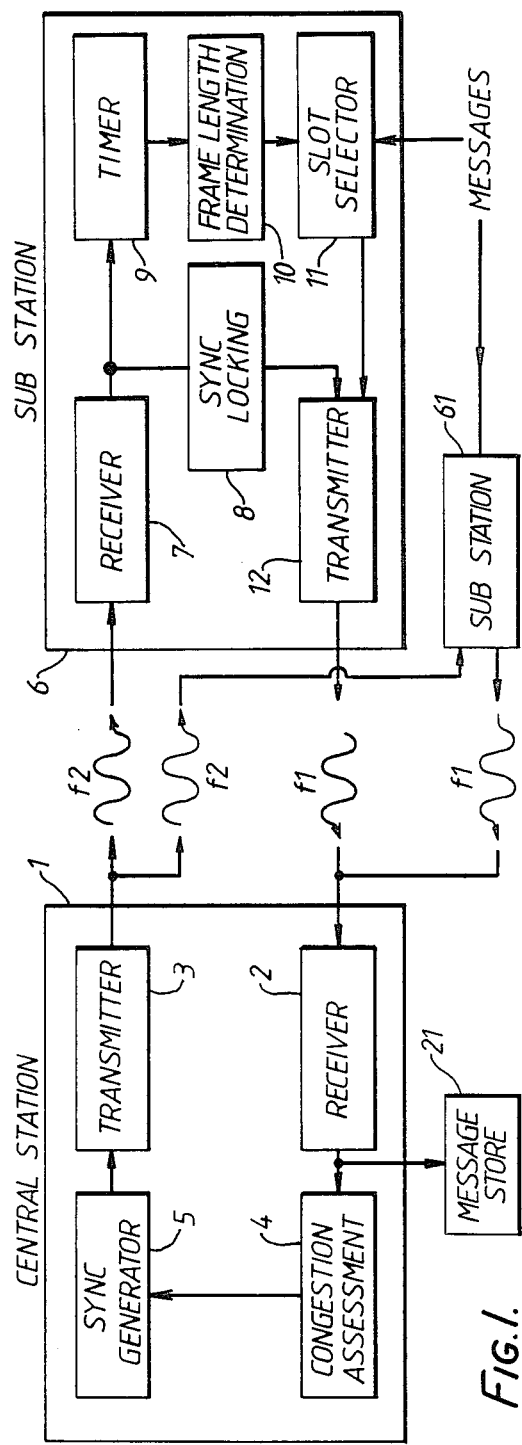
FIG. 1 is a schematic block diagram of a central station and two of a number of mobile sub-stations.
Figure 3:
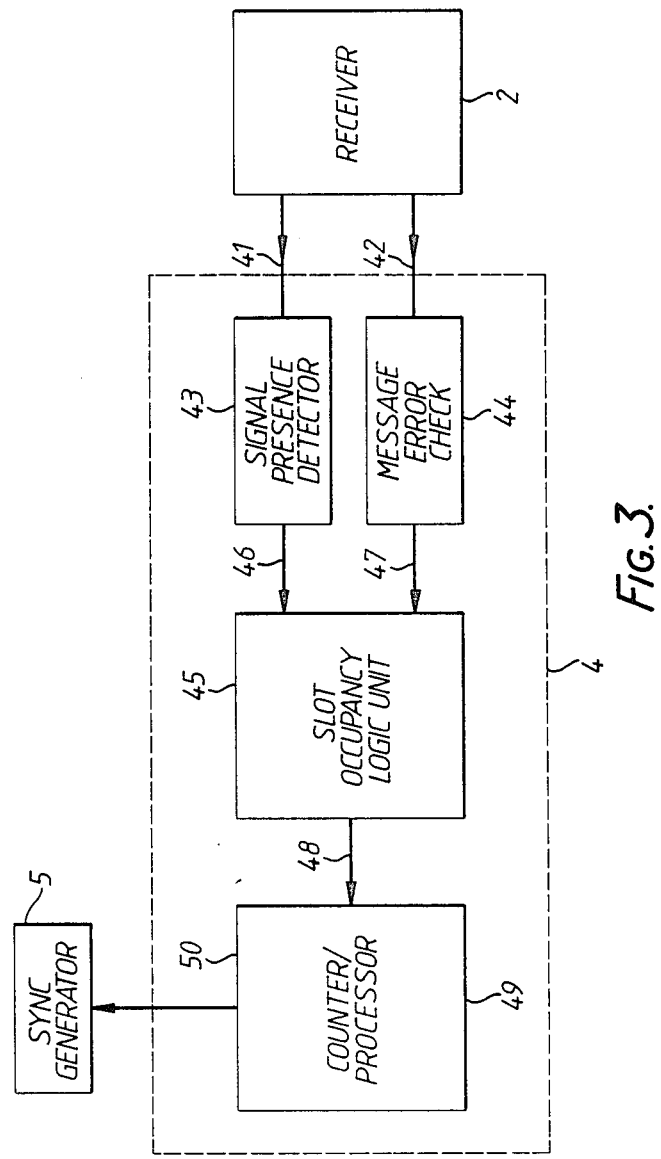
FIG. 3 is a schematic block diagram of part of the central station of FIG. 1.

Referring to FIG. 1, the central station 1 has a receiver 2 which receives digital control messages carried by radio signals having a first carrier frequency f1, transmitted by any sub-station; and transmits synchronising signals at a second carrier frequency f2 from a radio transmitter 3 to all of the sub-stations, of which only two, 6 and 61, are illustrated. The central station 1 also has a control system represented schematically by blocks 4 and 5. The block 4, shown in greater detail in FIG. 3, inspects the received signal and makes an assessment of prevailing traffic congestion. In this embodiment, the method of assessement is as follows. A signal presence detector 43 receives from the receiver 2 a signal strength indication signal 41, which represents the received signal energy, and provides logic output signal 46 indicating whether the current time slot is occupied. A message error check unit 44 receives from the receiver 2 the digital received signal 42, and determines whether any message in the current time slot is mutilated or not mulitated, using standard error-detecting codes contained within each transmitted message. If two or more sub-stations have transmitted in the same time slot, the check unit 44 will detect mutilation of the messages. The check unit 44 provides a logic output signal 47 indicating whether the time slot contains a mutilated or an unmulitated message. A slot occupancy logic unit 45 receives the logic output signals 46 and 47 and determines whether the current slot is empty, or full and unmutilated (i.e. good), or mutilated; an output signal 48, indicative of this determination, is provided to a counter/processor 49. The counter/processor 49 accumulates, over each time frame, the numbers of slots which are respectively empty, good and mutilated, and derives from these numbers an appropriate frame length in accordance with a predetermined algorithm such as that disclosed in U.S. Pat. No. 4,398,289 (supra). An output signal 50 indicative of that frame length is provided to block 5 which is a synchronizing pulse generator.

The block 5 contains a clock which defines equal time slots. However it generates synchronising pulses at times marking the beginning of particular slots only, these particular times being chosen to be spaced by an interval which is a one-to-one function of the frame length derived in block 4 and represented by the output signal 50. In this particular embodiment of the invention the spacing between adjacent synchronising pulses is made to be half the desired frame length. Each sub-station is then able to determine the frame length (e.g. frame 1, FIG. 2) as being double the length of the immediately preceding sync. pulse interval (S1-S2, FIG. 2). These synchronising signals are transmitted at 3.

The messages received at 2 convey intelligence from sub-stations to the central station 1, and are stored in a message store 21 for output.

In a sub-station 6 (which is one of many similar sub-stations such as sub-station 61), a receiver 7 receives the synchronising signals from the central station. The synchronising signals are used in a synchronising locking mechanism 8 which generates timing signals co-incident with those generated by the clock in the block 5, these timing signals defining a train of equal time slots.

On receipt of each synchronising signal, a timer 9 measures the number N of time slots between it and the immediately preceding synchronising signal. A block 10 derives, from this value N, the currently required length of a frame, which in this particular example is 2N.

A mechanism 11 receives messages to be transmitted and, at the end of each frame, selects a time slot in a next frame (as defined by block 10) in which the next message is to be transmitted. This selection may be random but in this particular example is according to a predetermined rule as set out in our patent specification No. GB-2166929A. Such a rule is a follows. Each substation contains a means defining an identity number, different from the identity number in any other substation. The substation also contains means for dividing its identity number by the number of slots in a frame, and for extracting the remainder from this division. The time-slot to be used for transmission is then selected depending on the calculated remainder, and may for example be the (R+1)th slot, R being the remainder.

A transmitter 12 receives the synchronising pulses from 8 and transmits the message in the selected slot.

Figure 2:
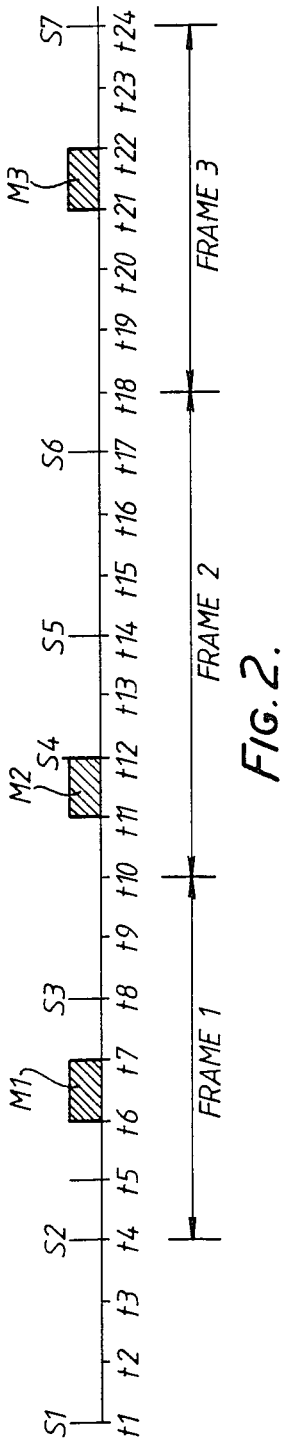
FIG. 2 is a timing diagram showing the signal transmitted from the central station and one of the sub-stations of FIG. 1.

FIG. 2 shows the transmitted signal which is notionally divided into time slots beginning at times t1,t2 . . . Synchronising signals are transmitted at times S1,S2 . . . . At the end of each frame, determined at 10 in each sub-station, a new frame is defined whose length is twice the number of time slots between the immediately preceding two synchronising signals, as stated above. Thus, frame 2 illustrated in FIG. 2 is twice the number of time slots between S2 and S3 i.e. $2\times4=8$; and frame 3 is twice the number of time slots between 55 and 56 i.e. $2\times3=6$. Messages M1, M2 and M3 are shown in FIG. 2 being transmitted in one slot of each frame selected at 11.

In this example, the digital signals transmitted from transmitters 1 and 12 and receivers 2 and 7 employ baseband minimum shift keying modulation at 300 baud (bits per second), although any form of digital modulation could be used.

Figure 4:
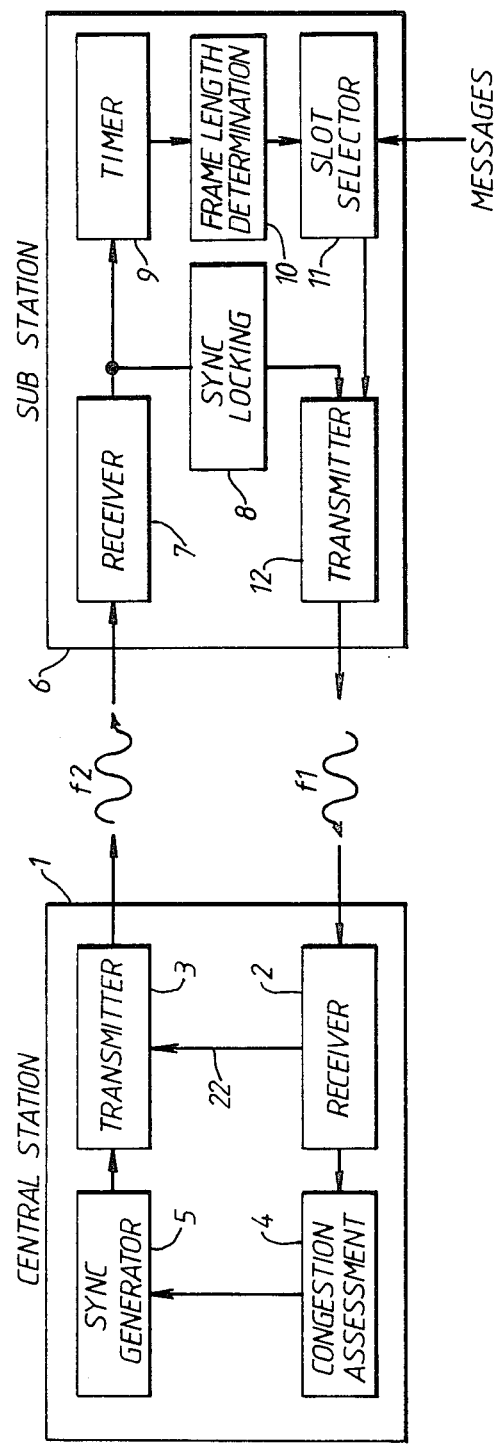
FIG. 4 is a schematic block diagram of a central station and one of a number of mobile sub-stations, similar to those of FIG. 1 but adapted for use with voice-carrying signals as well as control signals.

In a further example of the invention, shown in FIG. 4, in which parts common to FIG. 1 are denoted by the same reference numerals, the transmitted messages contain service request messages relating to the setting up of two-way speech calls between sub-stations, and relayed via link 22 through the central station 1, and apparatus shown in FIG. 4 forming part of a mobile trunked radio system.

We claim:

1. A communication system comprising: a central station (1) having means (5,3) for transmitting synchronizing signals each defining the beginning of a time slot and means (4) for selecting the intervals between synchronising signals from different integral multiples of a time slot and for providing to said transmitting means signals corresponding to said intervals; and a number of sub-stations (6,61) each having means (10,11,12) which is responsive to the timing of the synchronising signals and which is operative to transmit a message in a time slot selected from a number of time slots together forming a frame, the duration of said frame being determined by said synchronizing signals.

2. A communication system according to claim 1 in which the means responsive to the timing of the synchronising signal measures a time interval between two adjacent synchronising signals.

3. A communication system according to claim 2 in which the said number of time slots defines a "frame" of a length which is different from the said time interval.

4. A central station for a communication system which also includes a number of sub-stations, the central station comprising means for transmitting to each sub-station synchronising signals each defining the beginning of a time slot and means, responsive to the observed occupancy of time slots by signals received from the sub-stations, for selecting, in accordance with a predetermined algorithm, the intervals between the synchronising signals from different multiples of a time slot and for transmitting signals corresponding to said intervals to said transmitting means.

5. A sub-station for a communications system which comprises a central station according to claim 4 and at least one other sub-station, the sub-station comprising means which is responsive to the timing of synchronising signals received from the central station to determine the number of equal-length time slots to be allocated to a variable-length frame, and which is operative to transmit a message to the central station within a time slot selected from the frame.

6. A sub-station according to claim 5 in which the means responsive to the timing of the synchronising signal measures a time interval between two adjacent synchronising signals.

7. A sub-station according to claim 6 in which the said number of time slots defines a "frame" of a length which is different from the said time interval.

* * * * *